US009305566B2

(12) United States Patent
Wakabayashi

(10) Patent No.: US 9,305,566 B2
(45) Date of Patent: Apr. 5, 2016

(54) AUDIO SIGNAL PROCESSING APPARATUS

(75) Inventor: Isao Wakabayashi, Kobe (JP)

(73) Assignee: FUJITSU TEN LIMITED, Kobe-shi (JP)

( * ) Notice: Subject to any disclaimer, the term of this patent is extended or adjusted under 35 U.S.C. 154(b) by 1075 days.

(21) Appl. No.: 13/298,922

(22) Filed: Nov. 17, 2011

(65) Prior Publication Data

US 2012/0140598 A1 Jun. 7, 2012

(30) Foreign Application Priority Data

Dec. 2, 2010 (JP) ................................. 2010-269712

(51) Int. Cl.

| | |
|---|---|
| ***H04B 1/06*** | (2006.01) |
| ***G10L 21/0208*** | (2013.01) |
| ***H04S 5/00*** | (2006.01) |
| *G10L 19/008* | (2013.01) |
| *G10L 25/06* | (2013.01) |
| *H04S 1/00* | (2006.01) |

(52) U.S. Cl.

CPC ............... *G10L 21/0208* (2013.01); *H04S 5/00* (2013.01); *G10L 19/008* (2013.01); *G10L 25/06* (2013.01); *H04R 2499/13* (2013.01); *H04S 1/007* (2013.01); *H04S 2400/05* (2013.01)

(58) Field of Classification Search

CPC ... G10L 21/0208; G10L 19/008; G10L 25/06; H04S 5/00; H04S 1/007; H04S 2400/05; H04R 2499/13

See application file for complete search history.

(56) References Cited

U.S. PATENT DOCUMENTS

| | | | | | |
|---|---|---|---|---|---|
| 3,816,722 | A * | 6/1974 | Sakoe et al. | 708/424 |
| 4,024,344 | A | 5/1977 | Dolby et al. | |
| 4,821,294 | A * | 4/1989 | Thomas, Jr. | 375/343 |
| 5,235,646 | A * | 8/1993 | Wilde et al. | 381/17 |
| 5,661,813 | A * | 8/1997 | Shimauchi et al. | 381/66 |
| 6,215,408 | B1 * | 4/2001 | Leonard et al. | 340/644 |
| 6,504,838 | B1 * | 1/2003 | Kwan | 370/352 |
| 6,532,445 | B1 * | 3/2003 | Toguri et al. | 704/270 |
| 7,725,150 | B2 * | 5/2010 | Tupin et al. | 600/407 |
| 8,036,728 | B2 * | 10/2011 | Diab et al. | 600/336 |
| 8,515,107 | B2 * | 8/2013 | Hain et al. | 381/312 |
| 2001/0021814 | A1 * | 9/2001 | Schomburg | 600/509 |
| 2001/0038702 | A1 * | 11/2001 | Lavoie et al. | 381/307 |

(Continued)

FOREIGN PATENT DOCUMENTS

| | | |
|---|---|---|
| CN | 1625920 A | 6/2005 |
| JP | A-51-072402 | 6/1976 |

(Continued)

OTHER PUBLICATIONS

Dec. 23, 2013 Office Action issued in Chinese Patent Application No. 201110340888.X (with translation).

(Continued)

*Primary Examiner* — Luke Ratcliffe
*Assistant Examiner* — Amienatta M Ndure Jobe
(74) *Attorney, Agent, or Firm* — Oliff PLC

(57) ABSTRACT

A computing part computes a correlation coefficient representing a level of correlation among acoustic signals for a plurality of channels. A filtering part smoothes a time variation of the correlation coefficient computed. A center component reducer reduces a correlation component that is common in the acoustic signals by using the correlation coefficient. Then, the correlation component extracted by the reducer is reduced from each of the acoustic signals.

4 Claims, 14 Drawing Sheets

(56) References Cited

U.S. PATENT DOCUMENTS

| | | | | |
|---|---|---|---|---|
| 2006/0013101 | A1* | 1/2006 | Kawana et al. | 369/87 |
| 2007/0063912 | A1* | 3/2007 | Cortambert | 343/824 |
| 2008/0130927 | A1* | 6/2008 | Theverapperuma et al. | 381/318 |
| 2008/0267423 | A1* | 10/2008 | Hiekata et al. | 381/92 |
| 2009/0323789 | A1* | 12/2009 | Ragab et al. | 375/224 |
| 2010/0126332 | A1* | 5/2010 | Kobayashi | 84/613 |
| 2010/0277164 | A1* | 11/2010 | Tilbrook et al. | 324/244 |
| 2011/0050481 | A1* | 3/2011 | Itoh et al. | 342/27 |
| 2012/0086940 | A1* | 4/2012 | Shih et al. | 356/307 |

FOREIGN PATENT DOCUMENTS

| | | |
|---|---|---|
| JP | A-06-269098 | 9/1994 |
| JP | A-09-050293 | 2/1997 |
| JP | A-2006-303799 | 11/2006 |

OTHER PUBLICATIONS

May 27, 2014 Office Action issued in Japanese Patent Application No. 2010-269712 (partial English translation).

* cited by examiner

| $\alpha_0$ | $P_2 = L^2_{Re} + R^2_{Re} + (L^2_{Im} + R^2_{Im})(1-2\alpha_0)$ |
|---|---|
| 0 (WEAK CORRELATION) | $L^2_{Re} + R^2_{Re} + L^2_{Im} + R^2_{Im}$ |
| ⋮ | ⋮ |
| 1/2 (STRONG CORRELATION) | $L^2_{Re} + R^2_{Re}$ |

Fig.5

AUDIO SIGNAL PROCESSING APPARATUS

BACKGROUND OF THE INVENTION

1. Field of the Invention

The invention relates to signal processing of multiple channels.

2. Description of the Background Art

Conventionally, signal processing apparatuses that extract a specific component from an input signal, that identify a source of the signal based on the component extracted, that change the component extracted from the input signal and that output the component changed, are known.

For example, when extracting the specific component from the input signal, the signal processing apparatuses transform the input signal by using one of transformation methods of Fourier transform and Hilbert transform. Signal processing apparatuses that generate an output signal based on the signal transformed have been disclosed. Here, the signal transformed is, for example, a signal that consists of a real part and an imaginary part.

When using Fast Fourier Transform (FFT) for signal transformation, it is required to save the input signal to a storage area (hereinafter referred to as a "buffer") for every input signal having a predetermined length. On the other hand, when using Hilbert transform for the signal transformation processing, it is not required to save the input signal in the buffer but it is possible to process the input signals serially. Therefore, a processing load is lower and a tracking capability of signal processing to follow a change of the input signal can be improved when the signal processing apparatus performs the signal processing, by using Hilbert transform, as compared to by using Fourier transform.

However, when the signal processing apparatus generates the output signal based on the input signal, there is a case where the output signal contains noise in the signal processing by using Hilbert transform.

For example, in a case where an input signal is an acoustic signal, when a conventional signal processing apparatus performs processing that reduces a correlation component (hereinafter referred to also as a "center component") that is common in each of acoustic signals for multiple channels, by using Hilbert transform, the tracking capability of signal processing to follow a change of the acoustic signal can be improved. Here, the center component is a component localized in the proximity to a center between a right speaker and a left speaker. For example, in a case of a piece of music that includes a vocal and a musical accompaniment, the vocal corresponds to the center component.

However, because of high tracking capability of signal processing to follow a change of the acoustic signal, the rate of the center component of the acoustic signal may change rapidly. Since the signal processing apparatus performs the processing that reduces the center component changing rapidly, noise may be contained in an output signal. As a result, a user will hear output sound containing strong noise.

SUMMARY OF THE INVENTION

According to one aspect of the invention, a signal processing method that processes a signal includes the steps of: (a) computing a first correlation coefficient that represents a level of correlation among acoustic signals for a plurality of channels; (b) deriving a second correlation coefficient by smoothing a time variation of the first correlation coefficient; and (c) extracting a correlation component that is common in the acoustic signals by using the second correlation coefficient, and reducing the correlation component from each of the acoustic signals.

Noise superimposed on the acoustic signals can be prevented from being generated, and sound quality of acoustic information to be provided to a user can be ensured.

According to another aspect of the invention, the signal processing method further includes the step of (1) prior to the step (a), converting each of the acoustic signals into a signal consisting of a real part and an imaginary part, and the step (a) of the signal processing method computes the first correlation coefficient based on the signal consisting of the real part and the imaginary part.

The tracking capability of the signal processing to follow an acoustic signal can be improved.

According to another aspect of the invention, the step (a) computes a square value of a vector corresponding to each of the acoustic signals, then computes a specific correlation coefficient by which a value of the imaginary part in a first power is weighted, based on a value of a first power obtained by summing the square values computed and a value of an inner product of the vector, further computes a value of a second power by weighting the value the imaginary part in the first power by using the specific correlation coefficient, and then computes the first correlation coefficient based on the value of the second power and the value of the inner product.

An ideal correlation coefficient can be computed according to a level of the correlation among the acoustic signals for the plurality of channels.

Therefore, the object of the invention is to ensure sound quality when an output signal is generated based on an input signal.

These and other objects, features, aspects and advantages of the invention will become more apparent from the following detailed description of the invention when taken in conjunction with the accompanying drawings.

BRIEF DESCRIPTION OF THE DRAWINGS

FIG. 5 illustrates contents of power;

DESCRIPTION OF THE EMBODIMENTS

<First Embodiment>

<Technical Outline>

A first embodiment is hereinafter described in reference to the drawings. First, a technical outline of the embodiment is described.

A signal processing apparatus (e.g., a signal processing apparatus 10 shown in FIG. 2) that processes an acoustic signal computes a correlation coefficient that represents a level of correlation among acoustic signals for multiple channels (e.g., a right channel and a left channel). Next, the signal processing apparatus 10 filters a time variation of the correlation coefficient by using, for example, a low pass filter (hereinafter referred to as “LPF”) that cuts a frequency higher than a cutoff frequency. Then, the signal processing apparatus 10 derives a correlation coefficient of which time variation is smoothed as compared to the time variation of the correlation coefficient that has not been filtered.

Next, the signal processing apparatus 10 extracts a correlation component that is common in each of the acoustic signals for the multiple channels, and reduces the correlation component extracted, from each of the acoustic signals. As a result, noise superimposed on the acoustic signals can be prevented from being generated, and sound quality of acoustic information to be provided to a user can be ensured.

Here, a correlation component is also referred to as a center component, and is an acoustic signal corresponding to a sound image which is localized in the proximity to a center between a right speaker and a left speaker. For example, in a case of a piece of music that includes a vocal and a musical accompaniment, the correlation component is a component corresponding to the vocal.

Moreover, the correlation coefficient is a value that represents correlation among the acoustic signals for the multiple channels, i.e., a rate of the center component to a whole of each of the acoustic signals. For example, Hilbert transform is used to calculate the correlation coefficient of each of the acoustic signals. Processing that uses Hilbert transform is described later.

Figure 1A:
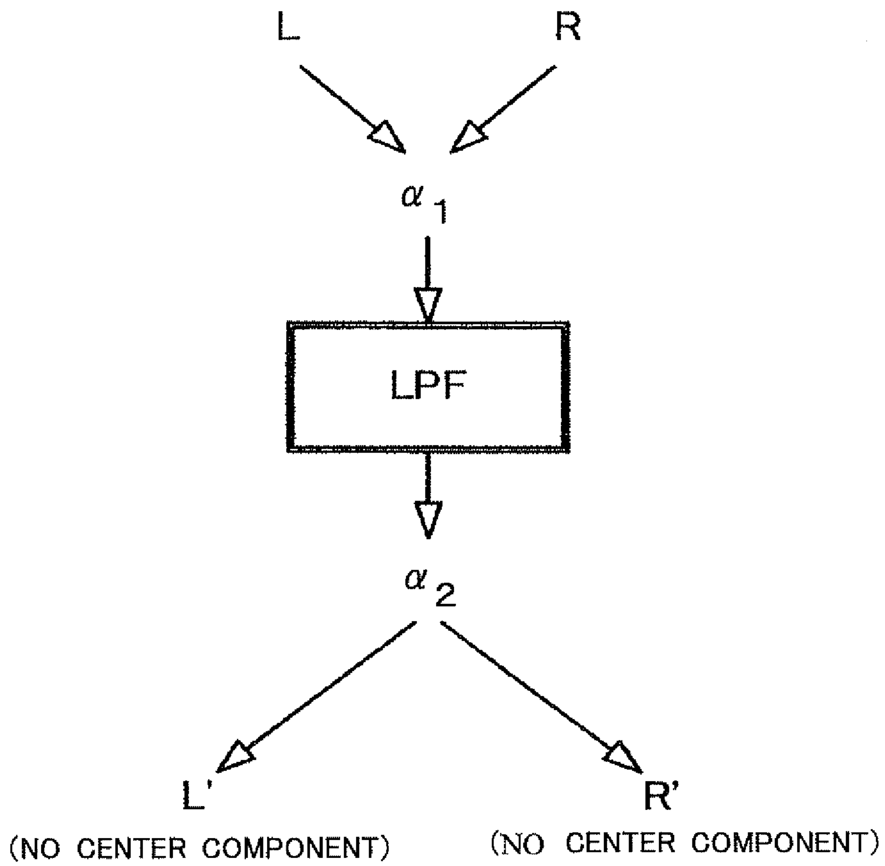
FIG. 1A is an outline of the method of reducing a correlation component in each of acoustic signals.
Figure 1B:
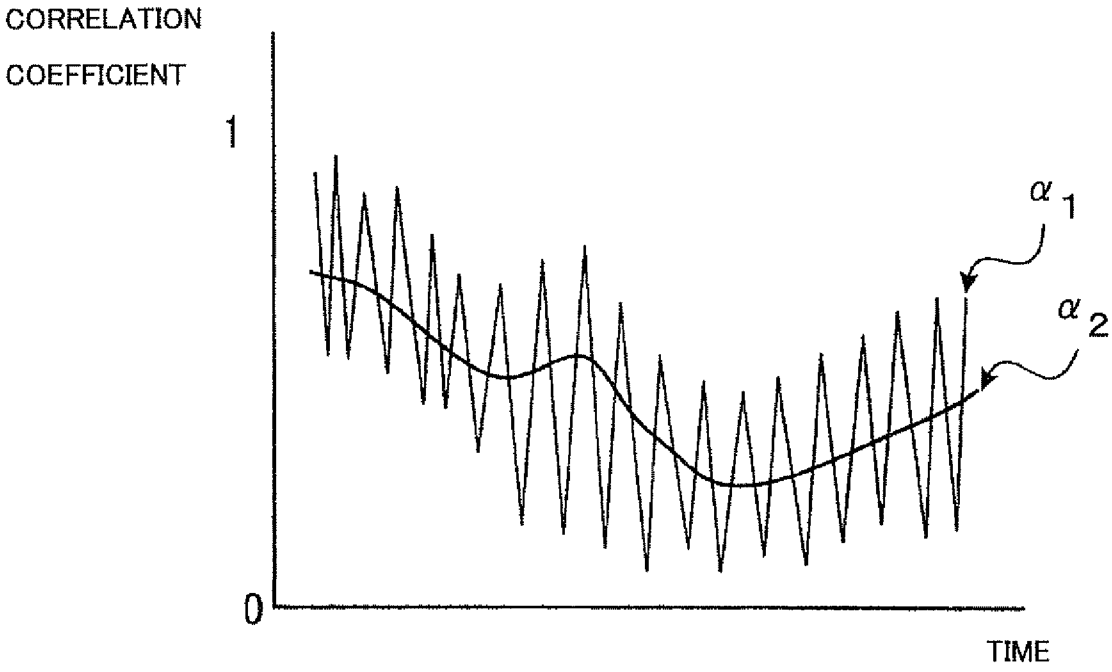
FIG. 1B illustrates time variations of correlation coefficients.

Next described concretely is processing that reduces the correlation component by using the signal processing apparatus 10, referring to FIG. 1. FIG. 1A illustrates an outline of a method of reducing the correlation component included in each of the acoustic signals. FIG. 1B illustrates time variations of the correlation coefficients.

As shown in FIG. 1A, in the method of reducing the correlation component included in each of the acoustic signals, first, the signal processing apparatus 10 applies Hilbert transform to each of the acoustic signals for the multiple channels (e.g., an acoustic signal L corresponding to the left channel and an acoustic signal R corresponding to the right channel) that are input signals. Thus, each of the acoustic signals is converted into a signal which consists of a real part and an imaginary part. A signal corresponding to the real part and a signal corresponding to the imaginary part are respectively indicated by vectors in rectangular coordinates.

Next, the signal processing apparatus 10 computes a square value of a vector corresponding to each of the acoustic signals. Then, the signal processing apparatus 10 computes a correlation coefficient based on both a sum of the values squared and values of inner products of the vectors (a vector of the acoustic signal for the left channel and a vector of the acoustic signal for the right channel). A detailed computation method of the correlation coefficient is described later.

When the signal processing apparatus 10 converts the acoustic signal by using Hilbert transform, a tracking capability of signal processing to follow a change of the acoustic signal becomes higher, as compared to other conversion methods (e.g., an acoustic signal conversion method by using FFT) because a processing load of the signal processing is relatively low. As a result, the correlation coefficient computed based on the acoustic signal repeats steep changes. In other words, the rate of the center component included in the acoustic signal changes rapidly.

Next, FIG. 1B is explained. FIG. 1B illustrates time variations of correlation coefficients $\alpha_1$ and $\alpha_2$. A horizontal axis shown in FIG. 1B represents time (e.g., ms), and a vertical axis shown in FIG. 1B represents correlation coefficient.

The correlation coefficient $\alpha_1$ in FIG. 1B shows a time variation of a correlation coefficient that has not been smoothed. When the signal processing apparatus 10 extracts the correlation component from each of the acoustic signals for the left and right channels, and reduces the correlation component from each of the acoustic signals, based on the correlation coefficient $\alpha_1$, much noise may be contained in the acoustic signals in which correlation components are reduced.

Therefore, in order to control the change of the correlation coefficient $\alpha_1$, the signal processing apparatus 10 smoothes the time variation of the correlation coefficient $\alpha_1$, by using a LPF, and computes the correlation coefficient $\alpha_2$ of which time variation is smoother than the correlation coefficient $\alpha_1$. The correlation coefficient $\alpha_2$ shows the time variation of the correlation coefficient after the smoothing.

In reference back to FIG. 1A, the signal processing apparatus 10 extracts the center component by multiplying the correlation coefficient $\alpha_2$ by a sum of the vectors of the acoustic signals for left and right channels. Then the signal processing apparatus 10 reduces the center component from each of the acoustic signals for left and right channels. As a result of reducing the center component, the acoustic signal L' corresponding to the left channel and the acoustic signal R' corresponding to a right channel are generated. Thus, noise superimposed on the acoustic signal can be prevented from being generated, and the sound quality of the acoustic information to be provided to the user can be ensured.

<Detailed Technology>

Figure 2:
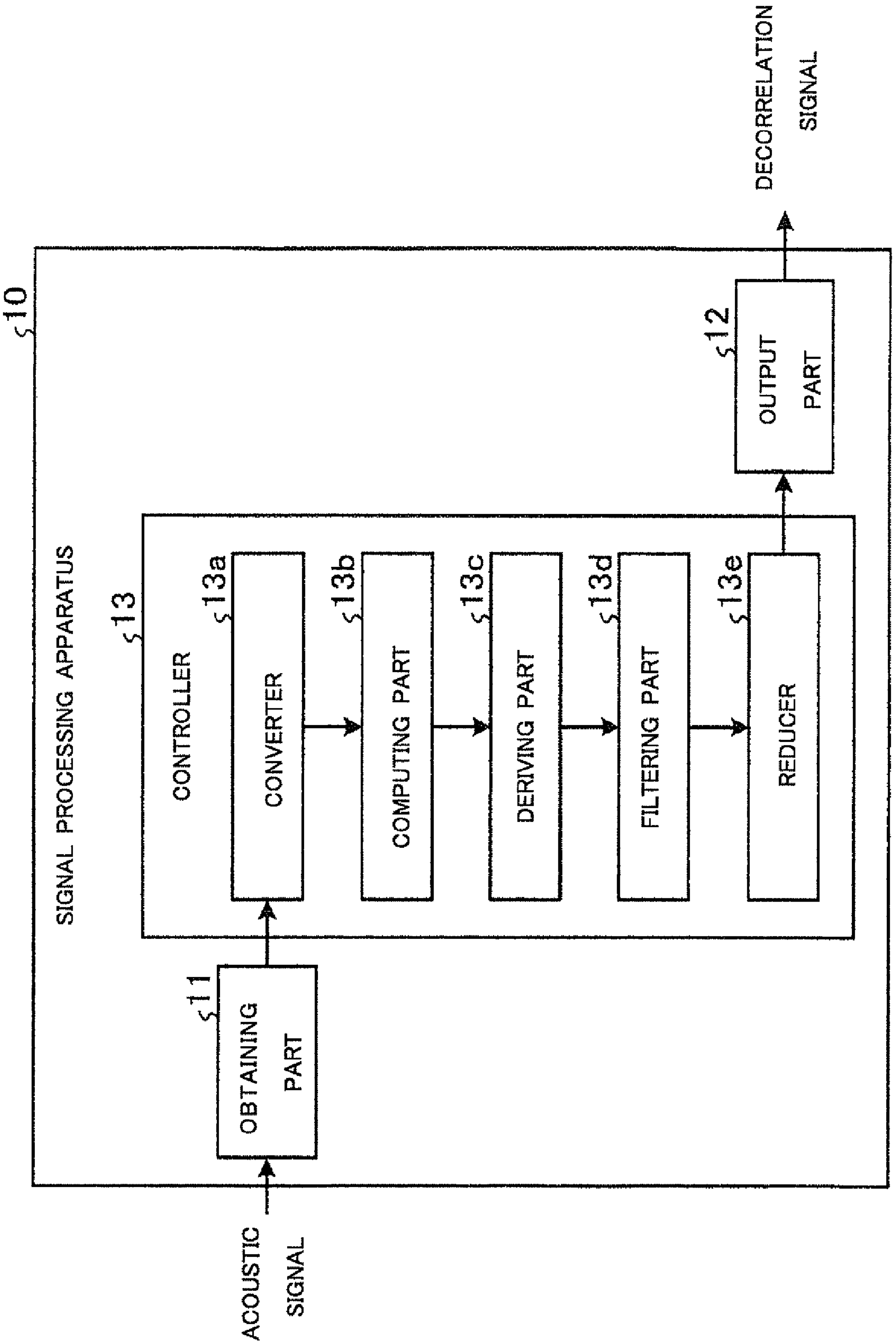
FIG. 2 is a block diagram of a signal processing apparatus.

Next described is a configuration of the signal processing apparatus 10, referring to FIG. 2. FIG. 2 is a block diagram of the signal processing apparatus 10.

The signal processing apparatus 10 includes an obtaining part 11, an output part 12, and a controller 13. Moreover, the controller 13 includes a converter 13*a*, a computing part 13*b*, a deriving part 13*c*, a filtering part 13*d* and a reducer 13*e*.

The obtaining part 11 obtains the acoustic signals for the left and right channels from an external device (e.g., a sound source 20 shown in FIG. 12A), and outputs the acoustic signals obtained to the conversion part 13*a* for each acoustic signal. Moreover, when the acoustic signals obtained are analog signals, the obtaining part 11 converts the analog signals into digital signals and outputs the digital signals to the converter 13*a*.

The output part 12 outputs the acoustic signals in which correlation component is reduced by the reducer 13*e* described later, to an external device (e.g., a speaker 50*a* and a speaker 50*b* shown in FIG. 12A). The acoustic signals output in this manner are acoustic signals (hereinafter referred to also as “correlation reduction signal”) obtained by reducing the center component that is the correlation component, from the acoustic signals obtained by the obtaining part 11. Moreover, the correlation reduction signal may be an analog signal or a digital signal.

The controller 13 mainly performs computing for various types of signal processing of the signal processing apparatus 10, and outputs a command signal to each part electrically connected.

When each of the acoustic signals for the left and right channels is input from the obtaining part 11, the converter 13*a* converts each of the acoustic signals into a signal consisting of a real part and an imaginary part, and outputs the signal converted to the computing part 13*b*.

Concretely, the converter 13*a* shifts a phase of each of the acoustic signals for the left and right channels by 90 degrees and generates a value which is equivalent to the imaginary part of each acoustic signal. Then the converter 13*a* outputs to the computing part 13*b* each acoustic signal consisting of the real part and the imaginary part. Thus, the tracking capability of the signal processing to follow an acoustic signal can be improved. A finite impulse response (FIR) type filter is an example of filters to be used.

Moreover, since Hilbert transform allows the signal processing apparatus 10 to generate the signal consisting of the real part and the imaginary part, unlike FFT, Hilbert transform does not require processing that temporarily saves an acoustic signal in a buffer and then that performs calculation. In other words, it becomes possible for the signal processing apparatus 10 to perform processing in closer to real time by using Hilbert transform.

The computing part 13*b* computes a square value of the vector corresponding to each of the acoustic signals for the left and right channels, based on the signal consisting of the real part and the imaginary part, which is received from the converter 13*a*. The computing part 13*b* computes a power $P_0$ that is a sum of the square values computed and an inner product $C_0$ that is an inner product value of the vectors of the acoustic signals.

Next, the computing part 13*b* computes a specific correlation coefficient $\alpha_0$ by which a value of the imaginary part in a power $P_2$ described later is weighted, by using the power $P_0$ and the inner product $C_0$. In other words, the computing part 13*b* computes the power $P_0$, the inner product $C_0$, and the specific correlation coefficient $\alpha_0$, by using the vector corresponding to each of the acoustic signals for the left and right channels represented on a complex plane having coordinate axes of the real part and the imaginary part.

Figure 3:
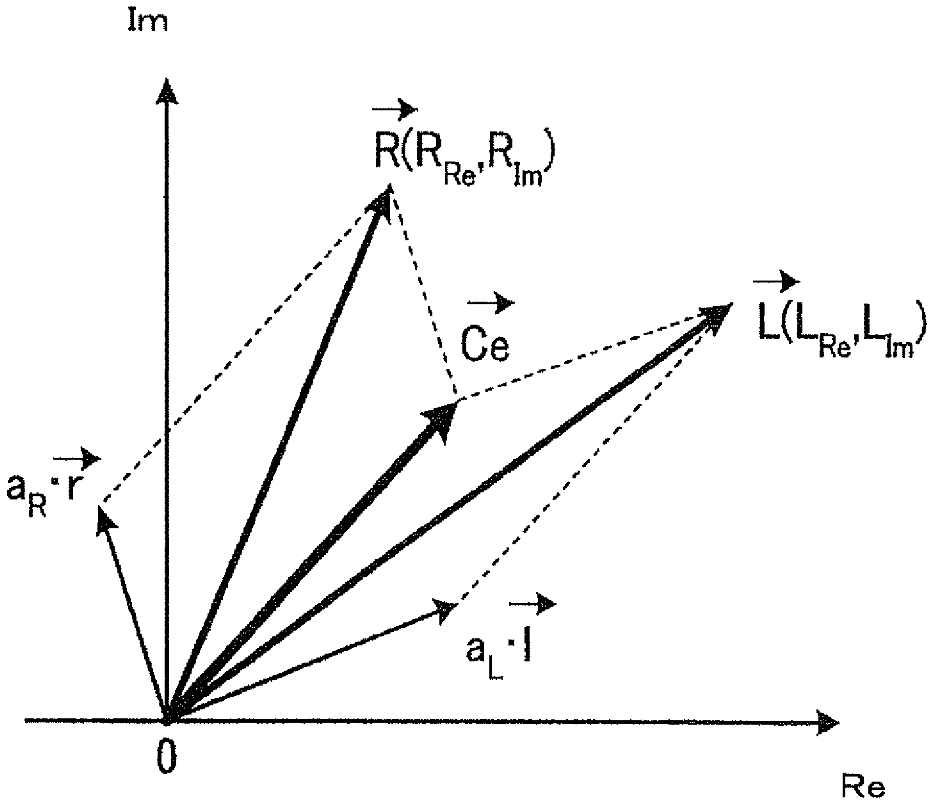
FIG. 3 illustrates an example of vectors corresponding to acoustic signals for left and right channels respectively.

Next described is the vector corresponding to each of the acoustic signals for the left and right channels on the complex plane. FIG. 3 illustrates an example of the respective vectors corresponding to the acoustic signals for the left and right channels.

On a complex plane having a horizontal coordinate axis of a real axis (Re) and a vertical coordinate axis of an imaginary axis (Im), a vector corresponding to an acoustic signal for the left channel is indicated by a vector L ($L_{Re}$, $L_{Im}$), and a vector corresponding to an acoustic signal for the right channel is indicated by a vector R ($R_{Re}$, $R_{Im}$).

Moreover, a vector Ce corresponding to a center component Ce is a part of components of each of the vector R and the vector L. In other words, the vector Ce is a value computed by multiplying a sum of the vector L and the vector R by the correlation coefficient $\alpha_2$ that is obtained by smoothing the time variation of the correlation coefficient $\alpha_1$, described referring to FIG. 1B.

A vector $a_L \cdot l$ is a vector derived by deducting the vector Ce from the vector L, and a vector $a_R \cdot r$ is a vector derived by deducting the vector Ce from the vector R. Here, the vector 1 and the vector r are unit vectors, and $a_R$ and $a_L$ are predetermined coefficients. Since being uncorrelated with each other, the vector $a_L \cdot l$ and the vector $a_R \cdot r$ are perpendicular to each other.

Next described is a concrete computation method for the correlation coefficient $\alpha_1$. The computing part 13*b* computes the power $P_0$ and the inner product $C_0$, by using the vector L ($L_{Re}$, $L_{Im}$) and the vector R ($R_{Re}$, $R_{Im}$).

Concretely, the computing part 13*b* computes the power $P_0$ by a formula (1) below.

<Formula 1>

$$P_0 = L^2_{Re} + R^2_{Re} + L^2_{Im} + R^2_{Im} \tag{1}$$

Moreover, the computing part 13*b* computes the inner product $C_0$ by a formula (2) below.

<Formula 2>

$$C_0 = L_{Re} \times R_{Re} + L_{Im} \times R_{Im} \tag{2}$$

Then, the computing part 13*b* computes the specific correlation coefficient $\alpha_0$, by using the power $P_0$ and the inner product $C_0$. Concretely, the computing part 13*b* computes the specific correlation coefficient $\alpha_0$ by a formula (3) below.

⟨Formula 3⟩

$$\alpha_0 = \frac{1}{2}\left[1 - \sqrt{\frac{P_0 - 2|C_0|}{P_0 + 2|C_0|}}\right] \tag{3}$$

When computing the specific correlation coefficient $\alpha_0$, the computing part 13*b* outputs to the deriving part 13*c* the specific correlation coefficient $\alpha_0$ computed along with the power $P_0$ and the inner product $C_0$. Moreover, the computing part 13*b* computes the real part in the power $P_0$ and the imaginary part in the power $P_0$, and outputs the real part computed and the imaginary part computed separately to the deriving part 13*c*.

The deriving part 13*c* derives the specific correlation coefficient $\alpha_1$ based on the values of the specific correlation coefficient $\alpha_0$, the power $P_0$, and the inner product $C_0$.

Concretely, the deriving part 13*c* computes the power $P_2$ by a formula (4) below.

<Formula 4>

$$P_2 = L^2_{Re} + R^2_{Re} + (L^2_{Im} + R^2_{Im})(1 - 2\alpha_0) \tag{4}$$

The power $P_2$ is computed by multiplying a component ($L^2_{Im}+R^2_{Im}$) of the imaginary part in the power $P_0$ by a weighting coefficient ($1-2\alpha_0$) including the specific correlation coefficient $\alpha_0$.

Then, the deriving part 13*c* determines the correlation coefficient $\alpha_1$, by using the power $P_2$ and the inner product $C_0$. Concretely, the deriving part 13*c* computes the correlation coefficient $\alpha_1$ by a formula (5) below.

⟨Formula 5⟩

$$\alpha_1 = \frac{1}{2}\left[1 - \sqrt{\frac{P_2 - 2|C_0|}{P_2 + 2|C_0|}}\right] \tag{5}$$

Moreover, the power $P_2$ is a hybrid-type power having characteristics of the power $P_0$ consisting of the components of the real part and the imaginary part and also characteristics of a power (hereinafter referred to as the "power $P_1$") consisting of only a component of the real part.

The filtering part 13*d* shown in FIG. 2 smoothes the time variation of the correlation coefficient $\alpha_1$ and outputs the correlation coefficient $\alpha_2$. Concretely, the filtering part 13*d* filters the correlation coefficient $\alpha_1$, by using, for example, a LPF, and outputs the correlation coefficient $\alpha_2$. More concretely, the filtering part 13*d* attenuates signals of frequencies, included in the correlation coefficient $\alpha_1$, exceeding a predetermined cutoff frequency, and outputs the correlation coefficient $\alpha_2$ that is composed of a signal in a frequency lower than the cutoff frequency.

The reducer 13*e* extracts the center component from each of the acoustic signals for the left and right channels, based on the correlation coefficient $\alpha_2$, and reduces the center component extracted from each of the acoustic signals.

Concretely, the reducer 13*e* computes the center component Ce by a formula (6) below.

<Formula 6>

$$Ce=\alpha_2(L+R) \quad (6)$$

The reducer 13*e* computes the acoustic signal L' and the acoustic signal R', by a formula (7-1) and a formula (7-2) below, by reducing the center component (Ce) respectively from each of the acoustic signals for the left and right channels, in which the center component have not been reduced. The acoustic signal L' and the acoustic signal R' are output to the output part 12.

<Formula 7>

$$L'=L-Ce \quad (7\text{-}1)$$

$$R'=R-Ce \quad (7\text{-}2)$$

Thus, noise superimposed on the acoustic signal can be prevented from being generated, and the sound quality of the acoustic signal provided to the user can be ensured.

Figure 4:
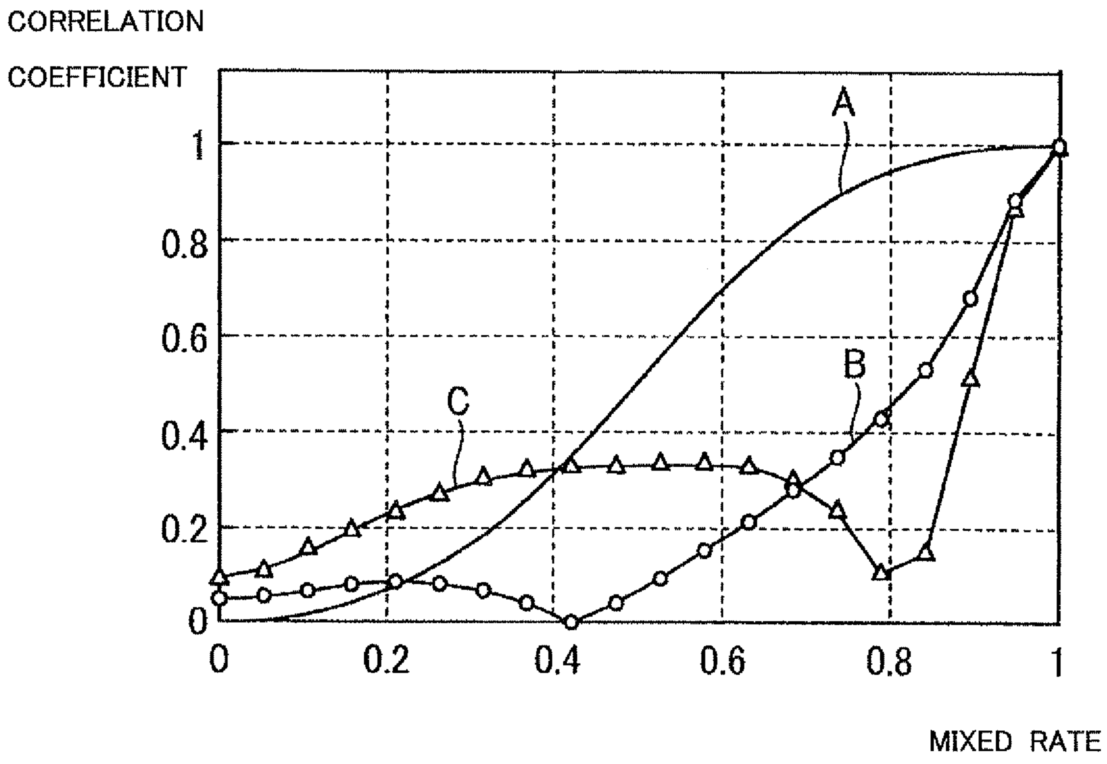
FIG. 4 illustrates a variation of a correlation coefficient according to a mixed rate of the acoustic signals for the left and right channels.

Next described are characteristics of correlation component reduction, in cases of the power $P_0$ and the power $P_1$, referring to FIG. 4. FIG. 4 illustrates variations of the correlation coefficients according to a rate that the acoustic signals for the left and right channels are overlapped or mixed together.

A horizontal axis shown in FIG. 4 represents the rate that the acoustic signals for the left and right channels are overlapped or mixed together (hereinafter referred to as mixed rate), and a vertical axis shown in FIG. 4 represents correlation coefficient.

A graph A shown in FIG. 4 illustrates a change of the correlation coefficient according to the mixed rate of the acoustic signals in which correlation component is not reduced. As shown in the graph A, when the mixed rate of the acoustic signals for the left and right channels is low (when the correlation between the acoustic signals for the left and right channels is weak), the correlation coefficient is close to zero (0). When the mixed rate of the acoustic signals for the left and right channels is high (when the correlation between the acoustic signals for the left and right channels is strong), the correlation coefficient is close to one (1). Acoustic signals among which the correlation coefficient is one (1) are monaural signals.

In order to provide acoustic information having rich realistic sound, to the user, it is required to reduce the correlation component as much as possible, regardless of the mixed rate. Concretely, it is preferable that the correlation coefficient is maintained at zero (0) immediately before the mixed rate becomes one (1) (in other words, before becoming a monaural signal).

A graph B illustrates that the correlation coefficient of the acoustic signals according to the mixed rate of the acoustic signals in which correlation component has been reduced based on the correlation coefficient computed by using the power $P_0$. Moreover, a graph C illustrates that the correlation coefficient of the acoustic signals according to the mixed rate of the acoustic signals in which the correlation component has been reduced based on the correlation coefficient computed by using the power $P_1$.

As shown in FIG. 4, the graph B shows a gradual change of the correlation coefficient in a range where the mixed rate is low (a range from 0 to 0.4 of the mixed rate), and also a low value of the correlation coefficient (approximately 0.1). As illustrated, in a case of the graph B, when the mixed rate is low, the value of the correlation coefficient between the acoustic signals becomes ideal.

However, although the reducer 13*e* performs the process that reduces the correlation component, the graph B shows that a value of the correlation coefficient increases as the mixed rate increases in a range where the mixed rate is medium or high (a range from 0.4 to 1 of the mixed rate). In other words, when the mixed rate is in the medium range to the high range, the correlation component included in each of the acoustic signals is not fully reduced.

The graph C shows a gradual change of the correlation coefficient and also a low value of the correlation coefficient (approximately 0.1) in a range where the mixed rate is relatively high (a range approximately 0.8 of the mixed rate). As illustrated, in a case of the graph C, when the mixed rate is relatively high, the value of the correlation coefficient between the acoustic signals becomes ideal. Moreover, in the case of the graph C, since the correlation component is reduced by using the power $P_1$, the component of the imaginary part is not computed. As a result, computing processing load, such as computation of the correlation coefficient, can be reduced.

However, although the reducer 13*e* performs the process that reduces the correlation component, the graph C shows that a value of the correlation coefficient of the acoustic signals is on the rise as the mixed rate increases, in a range where the mixed rate is low or medium (a range from 0.2 to 0.6 of the mixed rate). In other words, when the mixed rate is in the low range to the medium range, the correlation component included in each of the acoustic signals is not fully reduced.

In other words, there are cases where the correlation coefficient computed based on the power $P_0$ or the power $P_1$ is not appropriate to the mixed rate of the acoustic signals. Therefore, even if the reducer 13*e* reduces the correlation component included in each of the acoustic signals based on the correlation coefficient computed based on the power $P_0$ or the power $P_1$, the correlation component cannot be fully reduced. In other words, the correlation component remains in the acoustic signals.

Therefore, the deriving part 13*c* derives the correlation coefficient $\alpha_1$ by using the hybrid-type power $P_2$ having the characteristics of both power $P_0$ and the power $P_1$, to reduce the correlation component included in each of the acoustic signals as much as possible. Then, the reducer 13*e* reduces the correlation component included in each of the acoustic signals based on the correlation coefficient $\alpha_1$. An acoustic signal in which correlation component is reduced based on the correlation coefficient computed by using the power $P_2$, has a characteristic that a value of the correlation coefficient remain low regardless of a change of the value of the mixed rate.

FIG. 5 illustrates contents of the power $P_2$. The specific correlation coefficient $\alpha_0$ shown in FIG. 5 may take a value of $0 \le \alpha_0 \le 1/2$, for example.

The component $(L^2_{Im}+R^2_{Im})$ of the imaginary part in the power $P_2$ is weighted to change in a range from zero (0) to $(L^2_{Im}+R^2_{Im})$ according to the value of the specific correlation coefficient $\alpha_0$. For example, when the specific correlation coefficient $\alpha_0$ is "0," the power $P_2$ equals "$L^2_{Re}+R^2_{Re}+L^2_{Im}+R^2_{Im}$." Moreover, when the specific correlation coefficient $\alpha_0$ is ½, the power $P_2$ equals "$L^2_{Re}+R^2_{Re}$." Thus, even when the mixed rate changes, the correlation component can be reduced fully from each of the acoustic signals. As a result, the correlation coefficient between the acoustic signals can be reduced.

In other words, when the mixed rate of the acoustic signals is low, the power $P_2$ becomes close to a value computed based on the power $P_0$. When the mixed rate of the acoustic signals is high, the power $P_2$ becomes close to a value computed based on the power $P_1$.

Figure 6:
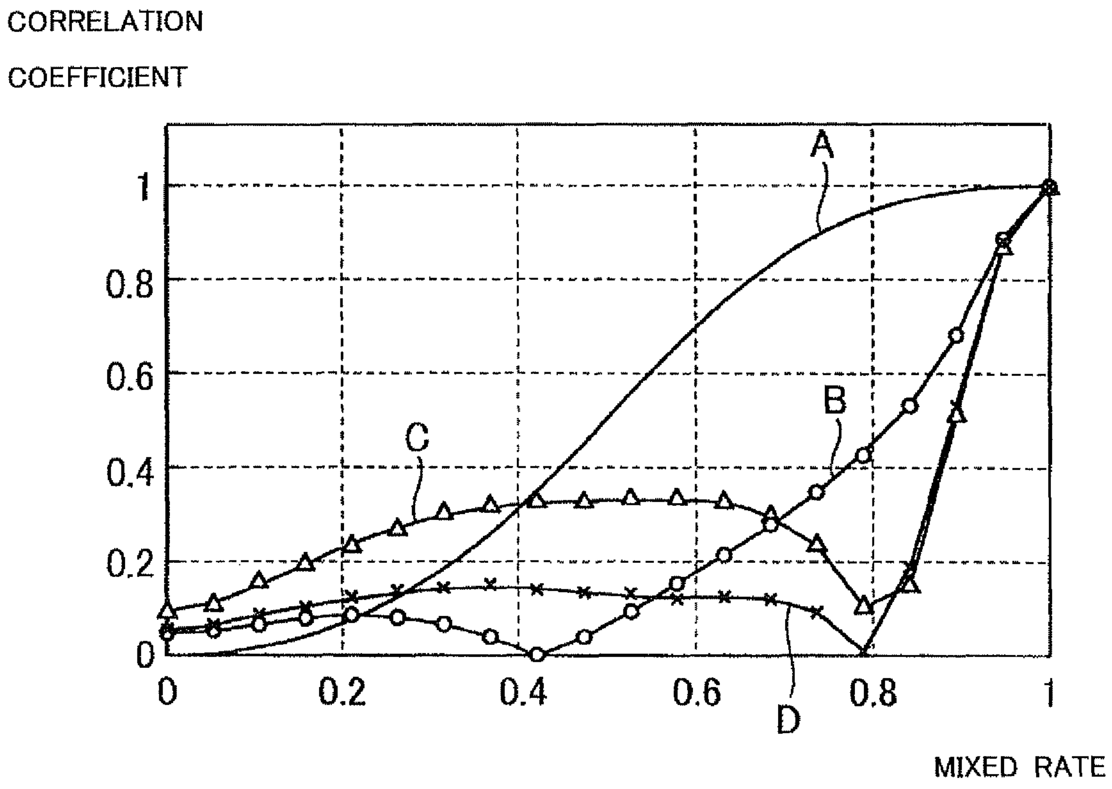
FIG. 6 is a figure that is obtained by adding a graph to the figure shown in FIG. 4.

Next described is a change of correlation component reduction according to a change of the mixed rate in a case of the power $P_2$. FIG. 6 illustrates a figure which a graph D is added to the figure shown in FIG. 4.

The graph D illustrates the correlation coefficient of the acoustic signals according to the mixed rate of the acoustic signals in which correlation component has been reduced based on the correlation coefficient computed based on the power $P_0$. In other words, the graph D illustrates that the correlation coefficient of the acoustic signals according to the mixed rate of the acoustic signals in which correlation component has been reduced based on the correlation coefficient computed by using the hybrid-type power $P_2$. The graph D shows that a value of the correlation coefficient changes stably at low level (approximately 0.1 of the correlation coefficient) in the low range through the relatively high range (a range of 0 to 0.8 of the mixed rate).

The stable change can be explained as follows: when the mixed rate is small (in other words, the value of the specific correlation coefficient $\alpha_0$ is low), weighting of the component of the imaginary part included in the power $P_2$ becomes great; and a characteristic similar to a case where a correlation coefficient is computed based on the power $P_0$ can be found. When the mixed rate is high (in other words, the value of the specific correlation coefficient $\alpha_0$ is high), the weighting of the component of the imaginary part included in the power $P_2$ becomes small, and a similar characteristic to the case where a correlation coefficient is computed based on the power$_0$ can be found.

In such a manner, the deriving part 13*c* comprehensively determines a level of the correlation between the acoustic signals for the left and right channels, based on the specific correlation coefficient $\alpha_0$, and then changes the weighting of the component of the imaginary part included in the power $P_2$, according to the value of the specific correlation coefficient $\alpha_0$.

In other words, the computing part 13*b* computes the specific correlation coefficient $\alpha_0$ by using the inner products $C_0$ of the vectors and the power $P_0$ that is a sum of squares of the vectors corresponding to the respective acoustic signals. Then the deriving part 13*c* derives the correlation coefficient $\alpha_1$, by using the inner product $C_0$ and the power $P_2$ computed based on the specific correlation coefficient $\alpha_0$. Thus, even when the mixed rate changes, the reducer 13*e* can fully reduce the correlation component from each of the acoustic signals. As a result, the correlation coefficient becomes low according to the correlation component.

Figure 7:
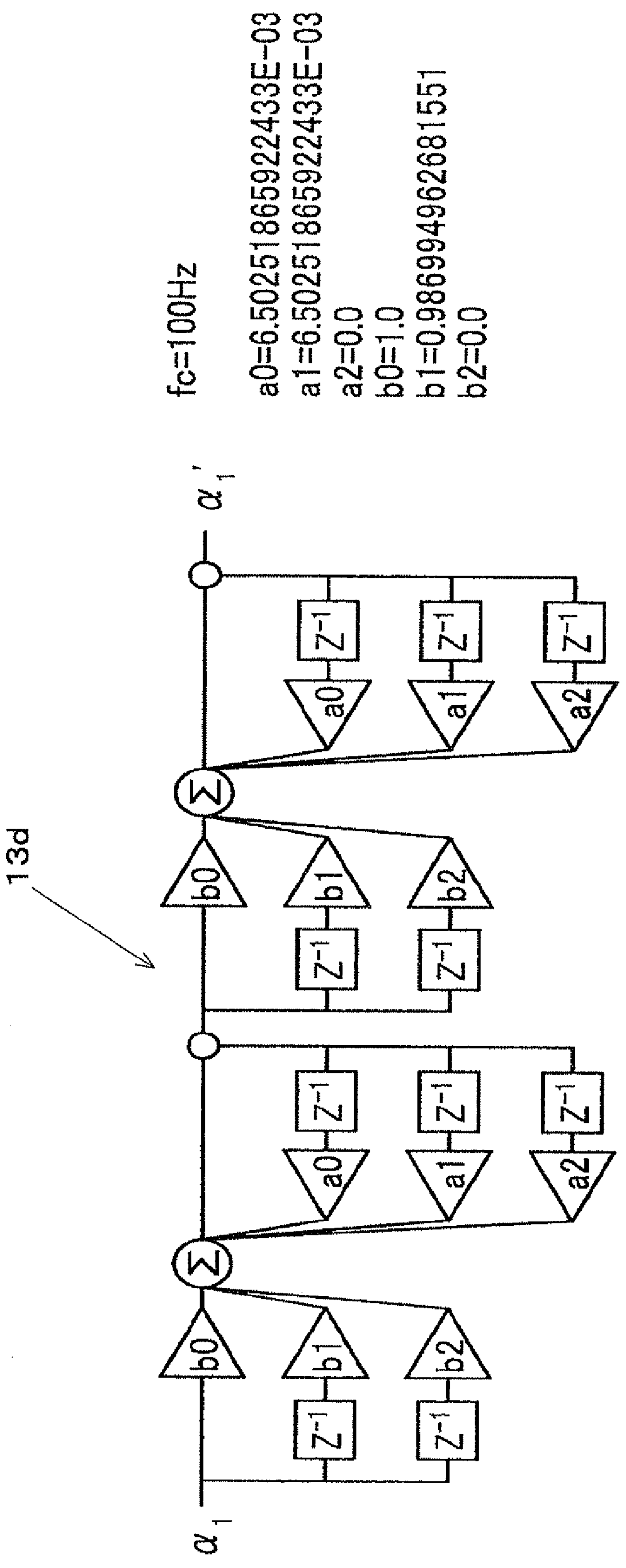
FIG. 7 illustrates an example of a low pass filter (LPF) configuration.

Next described is a configuration of a LPF that is an example of the filtering part 13*d*, referring to FIG. 7. FIG. 7 illustrates a configuration example of the LPF.

As shown in FIG. 7, the filtering part 13*d* has a configuration in which two quadratic Infinite Impulse Response (IIR) filters are disposed in series. Here, the IIR filter refers to a filter circuit where a following output is fed back and that has an impulse response function that is non-zero over an infinite length of time. In other words, the filtering part 13*d* is a filter circuit where an impulse response continues infinitely.

One of characteristics of the IIR filter is that a cutoff rate of the IIR filter is high even when a filter order is low. Therefore, the filtering part 13*d* can reduce noise accurately.

In order to configure a filter of which a cutoff frequency fc is 100 Hz in such a filter configuration, coefficients a0, a1, a2, b0, b1, and b2 of amplifiers are, for example, values shown in FIG. 7.

Figure 8:
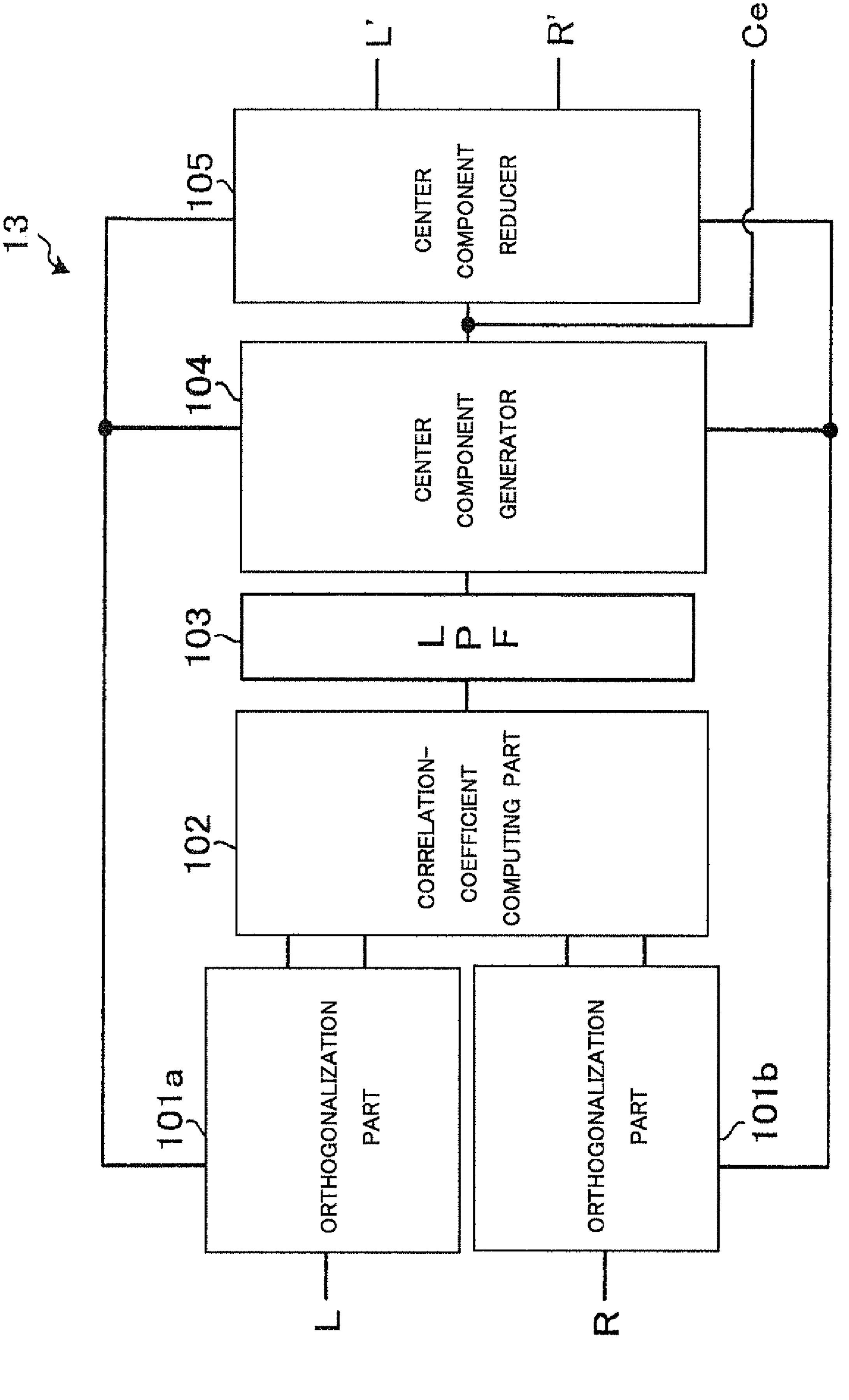
FIG. 8 illustrates a circuit configuration example of a controller in a first embodiment.

Next described is a case where the controller 13 of the signal processing apparatus 10 is applied to a circuit, referring to FIG. 8. FIG. 8 illustrates a circuit configuration example of the controller 13 in the first embodiment.

As shown in FIG. 8, the controller 13 includes an orthogonalization part 101*a*, an orthogonalization part 101*b*, a correlation-coefficient computing part 102, a LPF 103, a center component generator 104, and a center component reducer 105.

The orthogonalization part 101*a* and the orthogonalization part 101*b* are equivalent to the converter 13*a* shown in FIG. 2. The correlation-coefficient computing part 102 is equivalent to the computing part 13*b* and the deriving part 13*c*. Moreover, the LPF 103 is equivalent to the filtering part 13*d*. The center component generator 104 and the center component reducer 105 are equivalent to the reducer 13*e*.

When receiving an acoustic signal for the left channel, the orthogonalization part 101*a* converts the signal into a signal consisting of a real part and an imaginary part by Hilbert filter that shifts a phase of the acoustic signal by 90 degrees. Moreover, the orthogonalization part 101*a* outputs to the correlation-coefficient computing part 102 each of components of the real part and the imaginary part of the acoustic signal converted consisting of the real part and the imaginary part, and the correlation-coefficient computing part 102 outputs the component of the real part to the center component generator 104 and to the center component reducer 105.

Similarly, the orthogonalization part 101*b* converts an acoustic signal for the right channel into a signal consisting of a real part and an imaginary part by Hilbert filter and then outputs to the correlation-coefficient computing part 102 each of acoustic signal converted consisting of the real part and the imaginary part, for each of components of the real part and the imaginary part. Then, the correlation-coefficient computing part 102 outputs the component of the real part to the center component generator 104 and to the center component reducer 105.

The correlation-coefficient computing part 102 computes the specific correlation coefficient $\alpha_0$, by using the components of the real part and the imaginary part of each of the acoustic signals, and then derives the correlation coefficient $\alpha_1$, by using the specific correlation coefficient $\alpha_0$. A time variation of the correlation coefficient $\alpha_1$ is smoothed by the LPF 103, and the correlation coefficient $\alpha_2$ is output to the center component generator 104.

The center component generator 104 generates the center component Ce based on the components of the real parts of the acoustic signals for the left and the right channels, and correlation coefficient $\alpha_2$. Moreover, the center component generator 104 outputs the center component Ce generated to the center component reducer 105 and the output part 12.

The center component reducer 105 subtracts the center component Ce from the components of the real parts of the acoustic signals for the left and right channels, and outputs to the output part 12 the acoustic signal L' and the right acoustic signal R' obtained from the subtraction.

Next described is a concrete derivation process of the specific correlation coefficient $\alpha_0$. When the vector $a_L$·l and the vector $a_R$·r are defined as shown in FIG. 3 and also when the center component Ce is defined as the vector Ce, the vector L is represented in a formula (8-1), and the vector R is represented in a formula (8-2).

<Formula 8>

$$L = a_L \times l + Ce \tag{8-1}$$

$$R = a_R \times r + Ce \tag{8-2}$$

A value of the vector Ce is computed by a formula (9) below, by using the formula (8-1) for the vector L, the formula (8-2) for the vector R and the formula (6).

⟨Formula 9⟩

$$Ce = \frac{\alpha_0}{(1-2\alpha)}(\alpha_L \times l + \alpha_R \times r) \tag{9}$$

Then the value of the vector Ce computed by the formula (9) is substituted in the formula (8-1) and the formula (8-2). Thus, the vector L and the vector R are computed by a formula (10-1) and a formula (10-2).

⟨Formula 10⟩

$$L = a_L \times l + Ce = \left(\frac{(1-\alpha_0)}{(1-2\alpha_0)}a_L \times l_{Re} + \frac{\alpha_0}{(1-2\alpha_0)}a_r \times r_{Re}, \frac{(1-\alpha_0)}{(1-2\alpha_0)}a_L \times l_{Im} + \frac{\alpha_0}{(1-2\alpha_0)}a_R \times r_{Im}\right) \tag{10-1}$$

$$R = a_R \times r + Ce = \left(\frac{\alpha_0}{(1-2\alpha_0)}a_L \times l_{Re} + \frac{(1-\alpha_0)}{(1-2\alpha_0)}a_R \times r_{Re}, \frac{\alpha_0}{(1-2\alpha_0)}a_L \times l_{Im} + \frac{(1-\alpha_0)}{(1-2\alpha_0)}a_R \times r_{Im}\right) \tag{10-2}$$

The power $P_0$ that is represented in a sum of squares of the vector L and the vector R and the inner product $C_0$ of the vector L and the vector R are computed by formulae (11-1) and (11-2) respectively.

⟨Formula 11⟩

$$P_0 = |L|^2 + |R|^2 = \frac{\alpha_0}{(1-\alpha_0)}\frac{\alpha_0(1-\alpha_0)}{(1-2\alpha_0)^2}(a_L^2 \times l_{Re}^2 + a_R^2 \times r_{Re}^2 + a_L^2 \times l_{Im}^2 + a_R^2 \times r_{Im}^2) + \frac{(1-\alpha_0)}{\alpha_0}\frac{\alpha_0(1-\alpha_0)}{(1-2\alpha_0)^2}(a_L^2 \times l_{Re}^2 + a_R^2 \times r_{Re}^2 + a_L^2 \times l_{Im}^2 + a_R^2 \times r_{Im}^2) \tag{11-1}$$

$$C_0 = L \cdot R = \frac{\alpha_0(1-\alpha_0)}{(1-2\alpha_0)}(a_L^2 \times l_{Re}^2 + a_R^2 \times r_{Re}^2 + a_L^2 \times l_{Im}^2 + a_R^2 \times r_{Im}^2) \tag{11-2}$$

Then, by using the formulae (11-1) and (11-2), the computing part 13*b* computes the specific correlation coefficient $\alpha_0$ by a formula (12) below.

⟨Formula 12⟩

$$\alpha_0 = \frac{1}{2}\left[1 \pm \sqrt{\frac{P_0 - 2C_0}{P_0 + 2C_0}}\right] \tag{12}$$

Here, when the vector L is orthogonal to the vector R, the inner product $C_0$ equals zero (0) and the specific correlation coefficient $\alpha_0$ is one (1) or zero (0). Moreover, when the vector L is orthogonal to the vector R, the vector Ce equals zero (0). When these formulae are substituted into the formula (9), the specific correlation coefficient $\alpha_0$ equals zero (0). Therefore, the formula (12) is limited to a formula (13) below.

⟨Formula 13⟩

$$\alpha_0 = \frac{1}{2}\left[1 - \sqrt{\frac{P_0 - 2C_0}{P_0 + 2C_0}}\right] \tag{13}$$

However, the formula (13) is true only in cases of $0 \le C_0 < P_0/2$ and of $0 \le \alpha_0 \le 1/2$. Moreover, the inner product $C_0$ has a value in a range of $-P_0/2 \le C_0 < P_0/2$. Therefore, taking into consideration a case of $C_0 < 0$, the specific correlation coefficient $\alpha_0$ is set as expressed in the formula (3) described above.

<Second Embodiment>

In the first embodiment, the component of the imaginary part in the power $P_2$ that is the sum of the squares of the vector L and the vector R is not used or only a part of the component of the imaginary of the power $P_2$ is used to derive the correlation coefficient $\alpha_1$. When each of the acoustic signals is converted into the signal consisting of the real part and the imaginary part, computation of the component of the imaginary part requires processing more than computation of the component of the real part.

Therefore, in a second embodiment, a power and an inner product are computed without using a component of an imaginary part. In a case where any component of the imaginary part is not used, an accuracy of extracting a center component is reduced slightly as compared to the case where the component of the imaginary part is selectively used (e.g., the graph D shown in FIG. 6) as described in the first embodiment. However, a processing amount of computing a correlation coefficient is significantly reduced.

Processing of computing values of a power and an inner product and then correlation coefficient from values of the power and the inner product computed, without using the component of the imaginary part of an acoustic signal, is hereinafter described.

Figure 9:
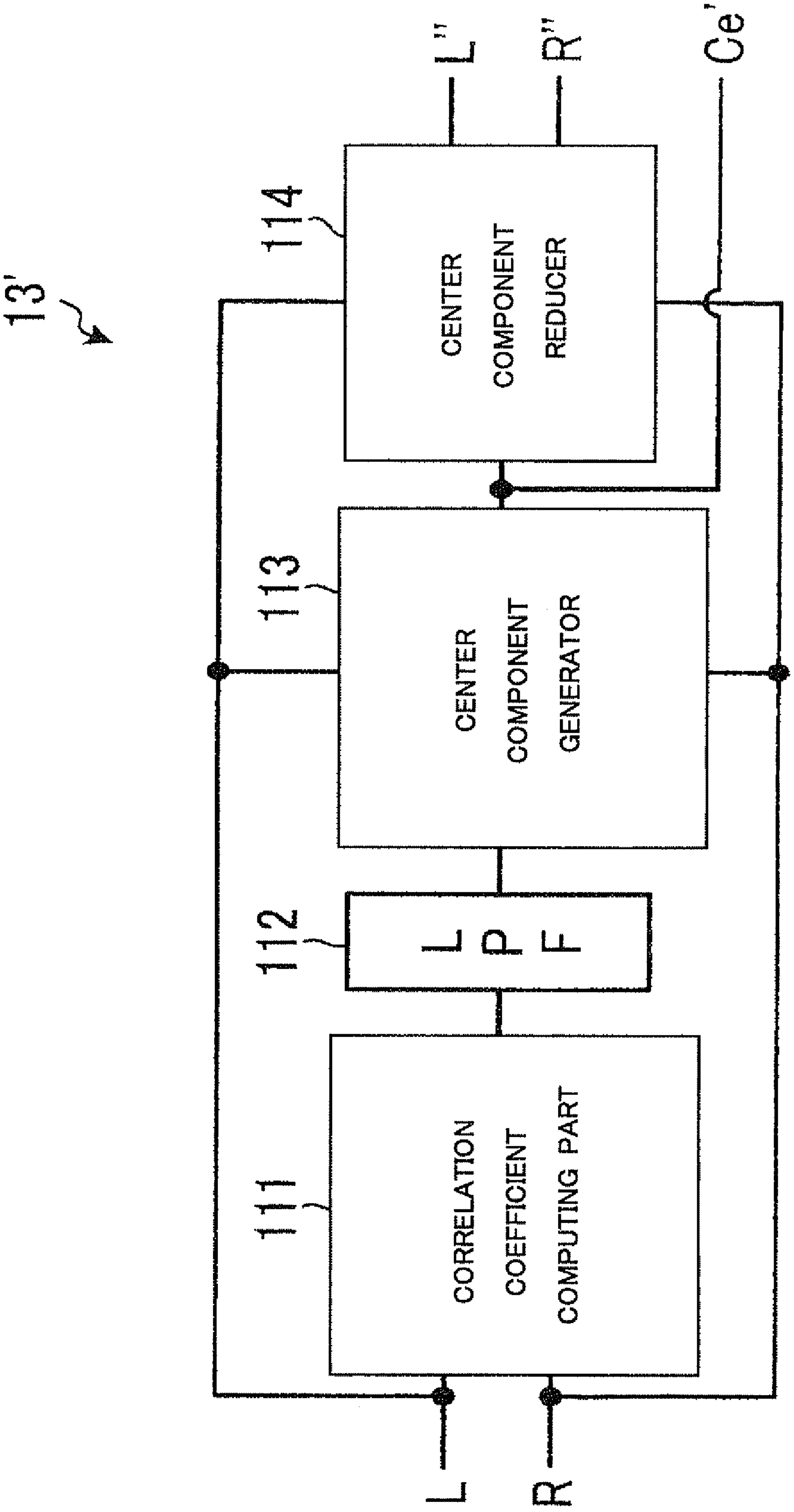
FIG. 9 illustrates a circuit configuration example of a controller in a second embodiment.

FIG. 9 illustrates a circuit configuration example of a controller 13' in the second embodiment. As shown in FIG. 9, the controller 13' includes a correlation coefficient computing part 111, a LPF 112, a center component generator 113, and a center component reducer 114. Signals for a left channel and a right channel output from an obtaining part 11 shown in FIG. 2 are input to the correlation coefficient computing part 111, the center component generator 113, and the center component reducer 114.

The correlation coefficient computing part 111 is a processing part for computing a correlation coefficient $\alpha_2$ by using each of the acoustic signals when receiving each of the acoustic signals for the left and right channels from the obtaining part 11.

Concretely, the correlation coefficient computing part 111 computes a power $P_3$ by a formula (14-1) below. Moreover, the correlation coefficient computing part 111 computes an inner product $C_1$ by a formula (14-2). Then the correlation coefficient computing part 111 computes a correlation coefficient $\alpha_3$ by a formula (14-3) below.

⟨Formula 14⟩

$$P_3 = L_{Re}^2 + R_{Re}^2 \quad (14\text{-}1)$$

$$C_1 = L_{Re} + R_{Re} \quad (14\text{-}2)$$

$$\alpha 3 = \frac{1}{2}\left[1 - \sqrt{\frac{P_3 - 2|C_1|}{P_3 + 2|C_1|}}\right] \quad (14\text{-}3)$$

The formula (14-1) described above is a formula which is obtained by eliminating the component $(L^2_{Im}+R^2_{Im})$ of the imaginary part from the formula (1). Moreover, the formula (14-2) described above is a formula which is obtained by eliminating the component $(L^2_{Im}\times R^2_{Im})$ of the imaginary part from the formula (2).

In such a manner, in the second embodiment, the correlation coefficient $\alpha_3$ is computed only by using the real part of each of the acoustic signals without converting each of the acoustic signals into a signal consisting of the real part and the imaginary part. Thus, the processing amount that the controller 13' requires to compute the correlation coefficient $\alpha_3$ can be significantly reduced. A configuration of the LPF 112 is not described here because the configuration of the LPF 112 is the same as the configuration of the LPF 103 shown in FIG. 8.

The center component generator 113 generates a center component Ce', by using the correlation coefficient $\alpha_3$ smoothed by the LPF 112 and the signals for the left and the right channels received from the obtaining part 11. Processing for the generation of the center component Ce' is the same as the processing performed by the center component generator 104 shown in FIG. 8.

The center component reducer 114 reduces the center component Ce' output from the center component generator 113 from each of the acoustic signals for the left and right channels received from the obtaining part 11, and then outputs to an output part 12 an acoustic signal L" and an acoustic signal R" obtained by reducing the center component.

The processing performed by the center component reducer 114 is the same as the processing performed by the center component reducer 105 shown in FIG. 8.

Figure 10:
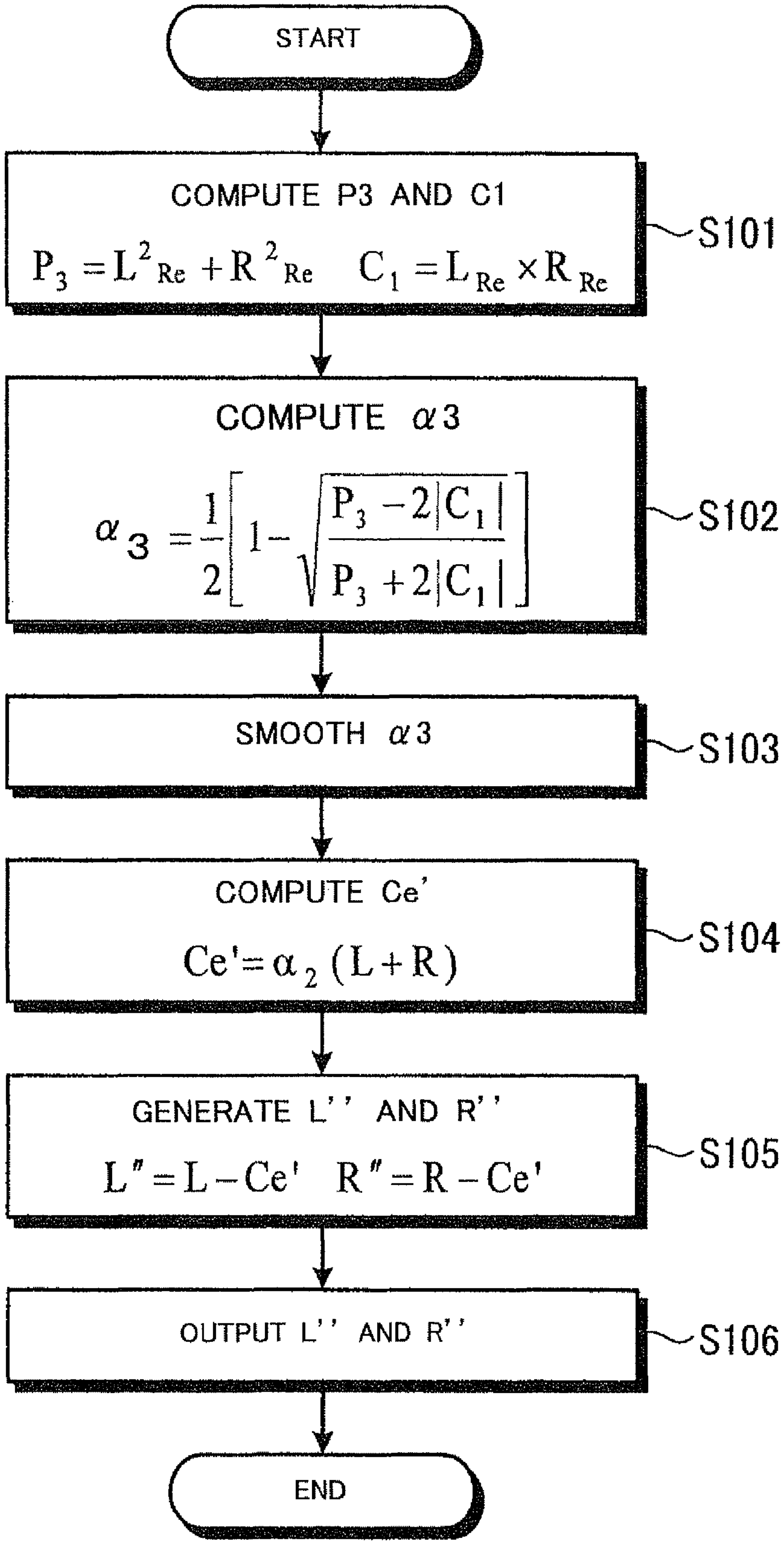
FIG. 10 is a flowchart illustrating processing performed by the controller.

Next described is concrete behavior of the controller 13', referring to FIG. 10. FIG. 10 illustrates a flowchart showing processing performed by the controller 13'.

As shown in FIG. 10, the correlation coefficient computing part 111 of the controller 13' computes the power $P_3$ and the inner product $C_1$ (a step S101), and then computes the correlation coefficient $\alpha_3$, by using the power $P_3$ and the inner product $C_1$ computed (a step S102).

Next, the LPF 112 smoothes the correlation coefficient α3 (a step S103). Then the center component generator 113 computes the center component Ce', by using a correlation coefficient α4 smoothed (a step S104).

Next, the center component reducer 114 generates the acoustic signal L" and the acoustic signal R" by reducing the center component Ce' from each of the acoustic signals (a step S105). The center component reducer 114 outputs to the output part 12 the acoustic signal L" and the acoustic signal R" generated (a step S106).

Figure 11:
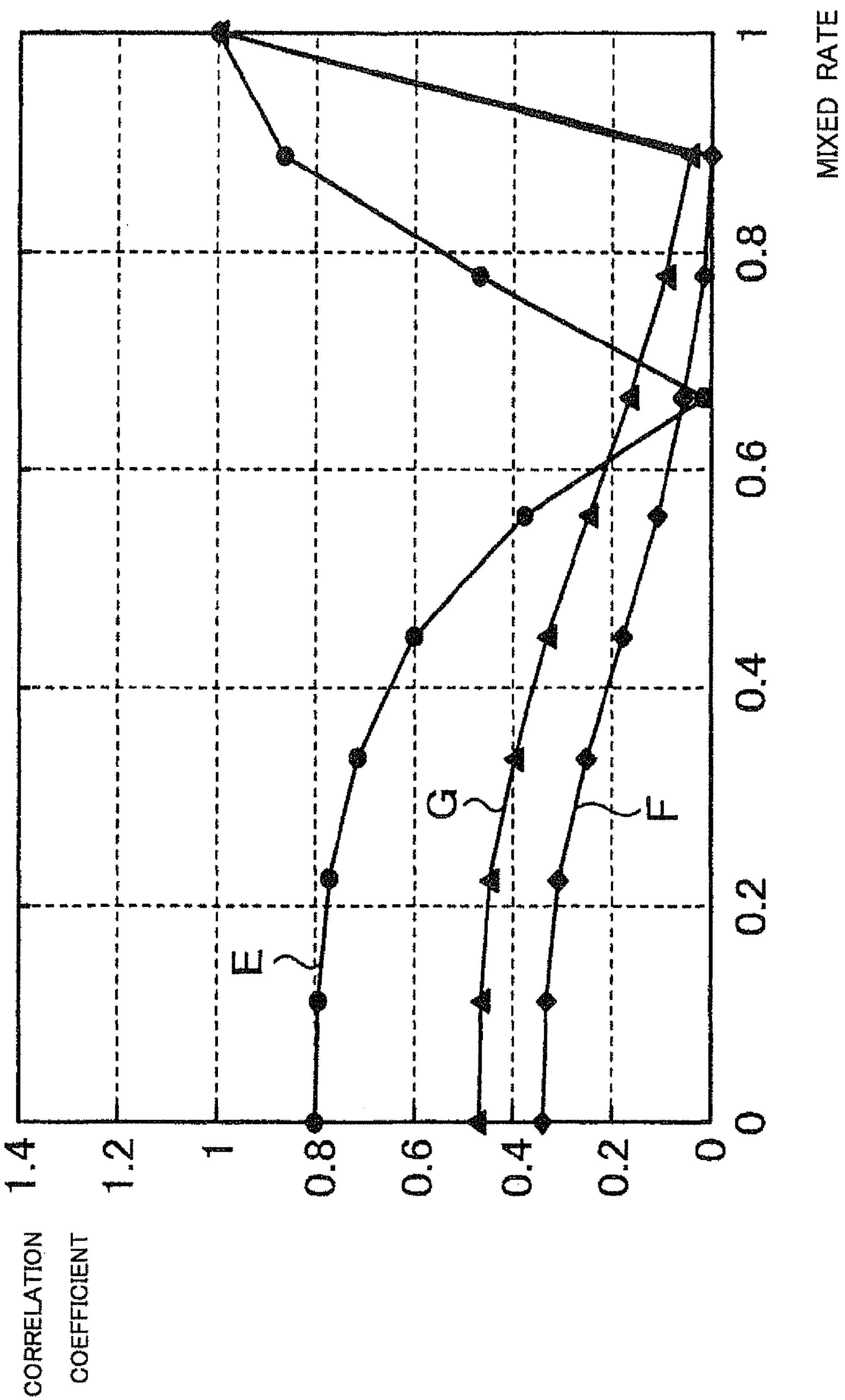
FIG. 11 is a graph illustrating variations of the correlation coefficients.

Next described is a characteristic of the correlation coefficient $\alpha_3$ computed by using the power $P_3$ and the inner product $C_1$, referring to FIG. 11. FIG. 11 illustrates changes of the correlation coefficients.

A graph E shown in FIG. 11 illustrates a variation of the correlation coefficient according to a mixed rate of acoustic signals, of which center component in a predetermined frequency band has been extracted. The graph E shows a high value of the correlation coefficient in a range where the mixed rate is low to middle. The variation of the correlation coefficient deviates from an ideal correlation coefficient change.

A graph F shown in FIG. 11 shows a variation of the correlation coefficient computed by using FFT. The graph F shows a high value of the correlation coefficient in a range where the mixed rate is low, but shows that the change of the correlation coefficient is similar to an ideal correlation coefficient change, as a whole. However, in a case where the FFT is used, processing amount increases. Therefore, serial processing cannot be performed.

A graph G illustrates the correlation coefficients of the acoustic signals according to the mixed rate of the acoustic signals in which the correlation component has been reduced based on the correlation coefficient computed by using power $P_3$. As compared to the case where the correlation coefficient is computed by using the FFT, the graph G shows a high value of the correlation coefficient in the range where the mixed rate is low to middle, but shows a more ideal correlation coefficient variation in a range where the mixed rate is high.

The correlation coefficient $\alpha_3$ is computed by using the power $P_3$, without using the component of the imaginary part. Thus the processing amount of reducing the correlation component is significantly reduced, as compare to a case of using the FFT. Concretely, when the processing amount required in the case of using the FFT is assumed as 100, the processing amount of reducing the correlation component in the second embodiment is approximately 1.5.

As described above, in the second embodiment, the inner product $C_1$ and the power $P_3$ that is the sum of the squares of vectors of the acoustic signals are computed, and then the correlation coefficient $\alpha_3$ is computed by using the power $P_3$ and the inner product $C_1$ computed. As a result, the center component can be reduced and the correlation coefficient becomes low. Moreover, the processing amount required to reduce the correlation component can be reduced significantly.

<Reproduction Apparatus>

The signal processing apparatus 10 in the first or the second embodiment described above applies, for example, to a vehicle-mounted acoustic field control system.

Hereinafter, a case where the signal processing apparatus 10 in the first or the second embodiment is applied to the vehicle-mounted acoustic field control system is described.

Figure 12A:
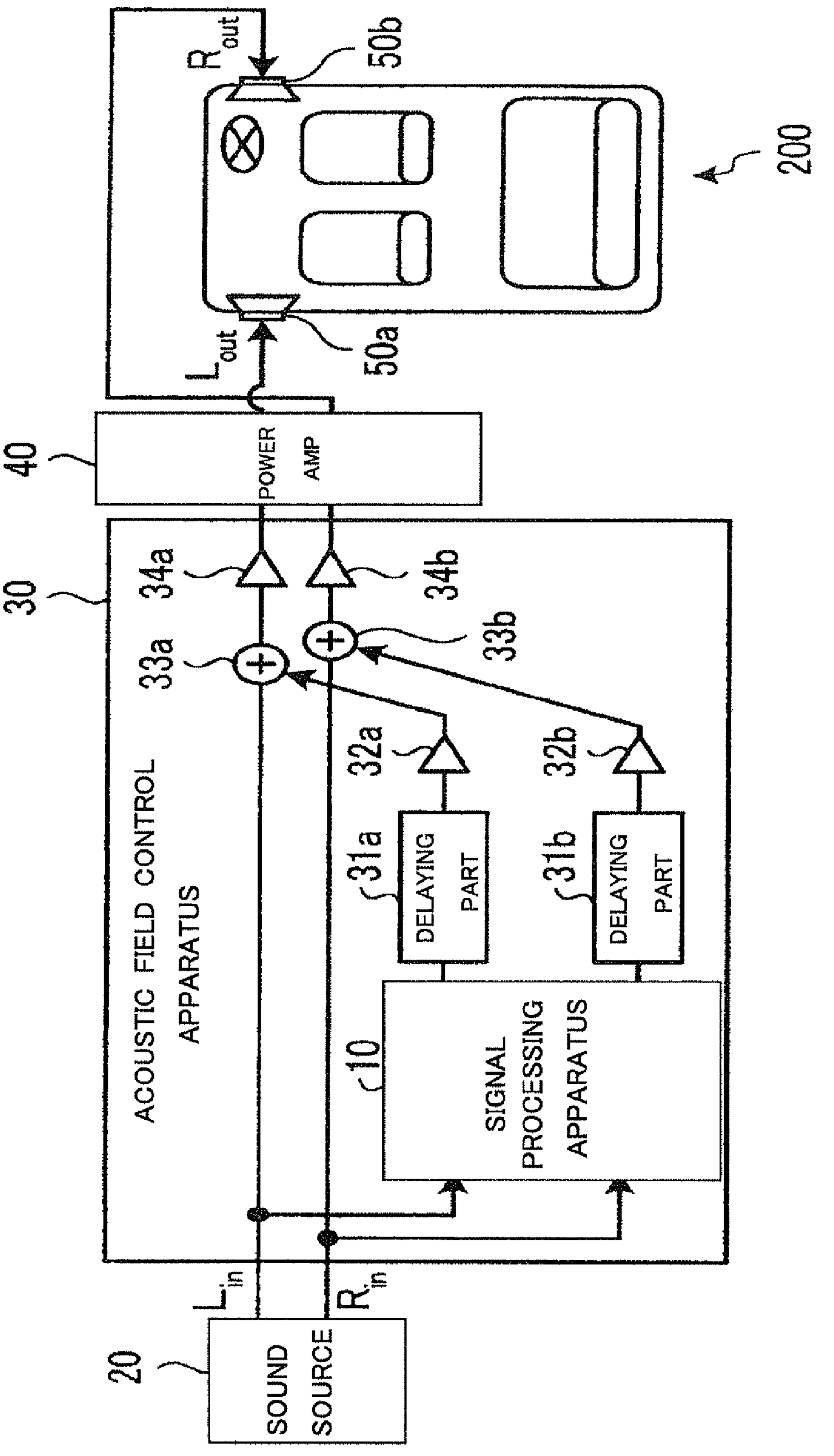
FIG. 12A illustrates a configuration example of a vehicle-mounted acoustic field control system.

A configuration example of a vehicle-mounted acoustic field control system, referring to FIG. 12A. FIG. 12A illustrates the configuration example of the vehicle-moutned acoustic field control system.

As shown in FIG. 12A, the vehicle-mounted acoustic field control system includes a sound source 20, an acoustic field control apparatus 30, a power amplifier 40, a speaker 50*a*, and a speaker 50*b*. These elements are included in a vehicle 200.

The acoustic field control apparatus 30 includes a signal processing apparatus 10, a delaying part 31*a*, a delaying part 31*b*, a multiplying part 32*a*, a multiplying part 32*b*, an adding part 33*a*, an adding part 33*b*, a multiplying part 34*a*, and a multiplying part 34*b*. In the acoustic field control apparatus 30, an acoustic signal output from the sound source 20 is input to the signal processing apparatus 10, the adding part 33*a* and the adding part 33_b_. Moreover, the acoustic signal input to the signal processing apparatus 10 is output to the delaying part 31_a_ and the delaying part 31_b_ after a center component Ce of the acoustic signal is reduced by the signal processing apparatus 10.

Next, the acoustic signal for the left channel in which the center component Ce has been reduced is output from the signal processing apparatus 10 and is delayed for a predetermined time period by the delaying part 31_a_. And then, amplitude of the acoustic signal is adjusted by the multiplying part 32_a_, and then the acoustic signal is output to the adding part 33_a_. The acoustic signal for the right channel in which the center component Ce has been reduced is output from the signal processing apparatus 10 and is delayed, for a predetermined time period by delaying part 31_b_. And then, amplitude of the acoustic signal is adjusted by the multiplying part 32_b_, and the acoustic signal is output to the adding part 33_b_.

Next, in the adding part 33_a_, the acoustic signal for the left channel, input from the sound source 20, including the center component Ce is added with the acoustic signal for the left channel, output from the multiplying part 32_a_, of which center component Ce has been reduced. Then, the acoustic signal added is output to the multiplying part 34_a_. Moreover, in the adding part 33_b_, the acoustic signal for the right channel, input from the sound source 20, including the center component Ce is added with the acoustic signal for the right channel, output from the multiplying part 32_b_, of which center component Ce has been reduced. Then, the acoustic signal added is output to the multiplying part 34_b_.

In such a manner, the acoustic field control apparatus 30 can provide a user with acoustic information having spatial impression, by adding the correlation reduction signal that is the acoustic signal of which the center component has been reduced with the acoustic signal including the center component. Moreover, by adding the correlation reduction signal with the acoustic signal including the center signal, with a delay of a predetermined time period, sound like echoed sound is output from the speaker 50_a_ and the speaker 50_b_. Thus the acoustic field control apparatus 30 can provide the user with a spatial impression of sound, furthermore.

The multiplying part 32_a_ is disposed between the delaying part 31_a_ and the adding part 33_a_, and the multiplying part 32_b_ is disposed between the delaying part 31_b_ and the adding part 33_b_. Thus, a ratio of a correlation component and a decorrelation component can be adjusted by adding the acoustic signal to the acoustic signal including the center component.

Next, amplitude of the acoustic signal output from the adding part 33_a_ is adjusted in the multiplying part 34_a_ and then the acoustic signal is output to the power amplifier 40. The acoustic signal amplified by the power amplifier 40 is output from the speaker 50_a_.

Moreover, amplitude of the acoustic signal output from the adding part 33_b_ is adjusted in the multiplying part 34_b_ and then the acoustic signal is output to the power amplifier 40. The acoustic signal amplified by the power amplifier 40 is output from the speaker 50_b_.

Figure 12B:
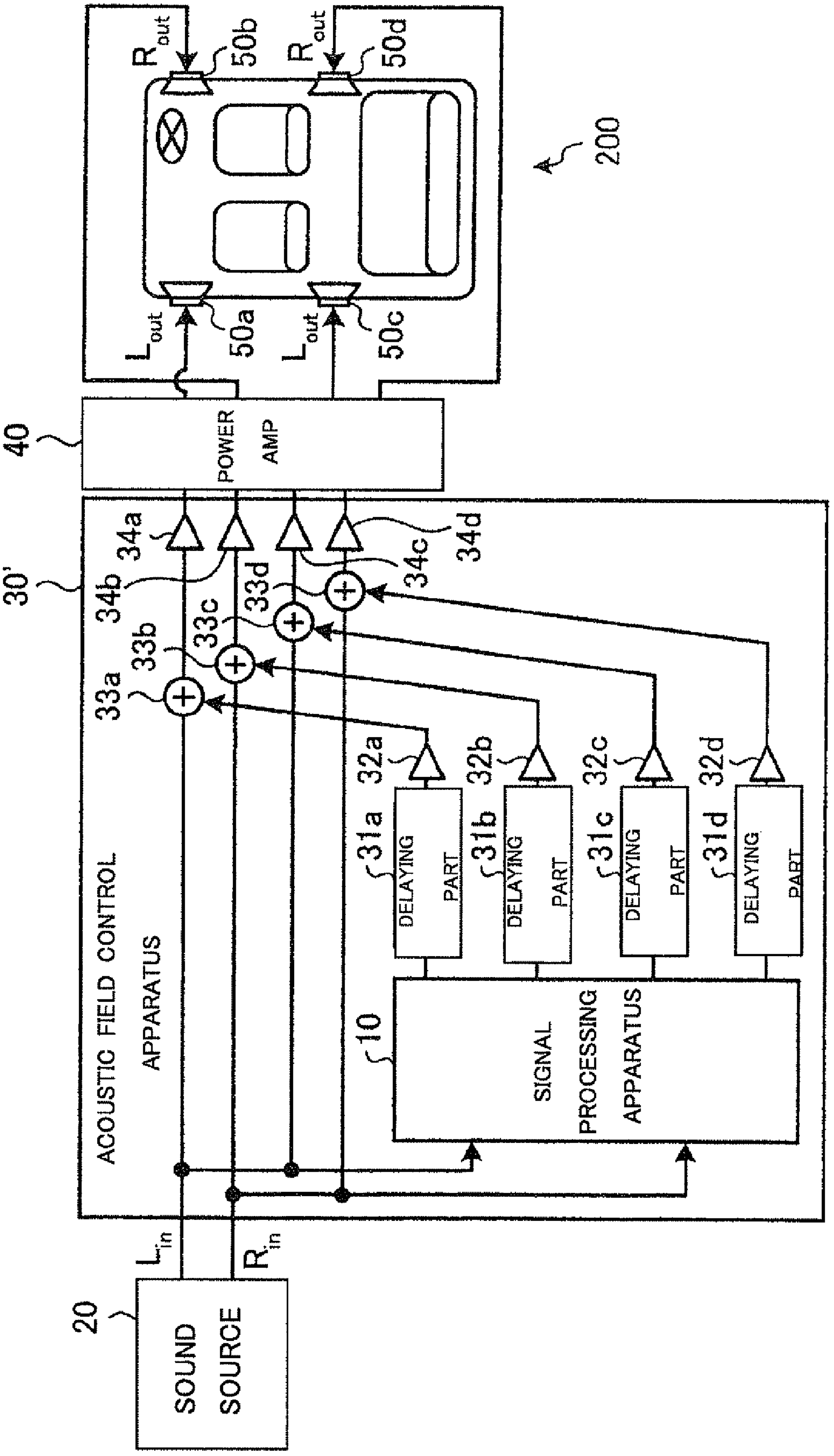
FIG. 12B illustrates a configuration example of a vehicle-mounted acoustic field control system.

In FIG. 12A, the speakers are disposed on a front seat side of the vehicle 200 but speakers may be also disposed on a rear seat side of the vehicle 200. Hereinafter, referring to FIG. 12B, a configuration example of a vehicle-mounted acoustic field control system where two pairs of left and right speakers are disposed on the vehicle 200, is described. FIG. 12B illustrates the configuration example of the vehicle-mounted acoustic field control system.

The vehicle-mounted acoustic field control system, illustrated in FIG. 12B, further includes a left speaker 50_c_ and a right speaker 50_d_, and also includes an acoustic field control apparatus 30' instead of the acoustic field control apparatus 30. The speaker 50_a_ and the speaker 50_b_ are disposed on the front seat side of the vehicle 200, and the left speaker 50_c_ and the right speaker 50_d_ are disposed on the rear seat side of the vehicle 200.

The acoustic field control apparatus 30' further includes a delaying part 31_c_, a delaying part 31_d_, a multiplying part 32_c_, a multiplying part 32_d_, an adding part 33_c_, an adding part 33_d_, a multiplying part 34_c_, and a multiplying part 34_d_ in addition to the constituent elements included in the acoustic field control apparatus 30. In other words, the acoustic field control apparatus 30' outputs, from the multiplying part 34_c_ to the left speaker 50_c_ via the power amplifier 40, a same acoustic signal as the acoustic signal output from the multiplying part 34_a_ to the left speaker 50_a_ via the power amplifier 40. The acoustic field control apparatus 30' outputs, from the multiplying part 34_d_ to the right speaker 50_d_ via the power amplifier 40 a same acoustic signal as the acoustic signal output from the multiplying part 34_b_ to the right speaker 50_b_ via the power amplifier 40.

The multiplying part 34_c_ receives from the adding part 33_c_ a signal generated by adding a correlation reduction signal output via the signal processing apparatus 10, the delaying part 31_c_, and the multiplying part 32_c_ with an acoustic signal for the left channel output from the sound source 20.

Moreover, the multiplying part 34_d_ receives from the adding part 33_d_ a signal generated by adding a correlation reduction signal output via the signal processing apparatus 10, the delaying part 31_d_, and the multiplying part 32_d_ with an acoustic signal for the right channel output from the sound source 20.

As described above, FIG. 12B illustrates a case where an acoustic signal is output from a pair of the speaker 50_a_ and the speaker 50_b_ disposed on the front seat side and also from a pair of the left speaker 50_c_ and the right speaker 50_d_ disposed on the rear seat side. However, a combination of speakers for output is not limited to the combination described above.

For example, the vehicle-mounted acoustic field control system may output only from the speakers 50_c_ and 50_d_ on the rear seat side an acoustic signal generated by adding the correlation reduction signal with the acoustic signal including the center component. In this case, the vehicle-mounted acoustic field control system outputs from the speakers 50_a_ and 50_b_ on the front seat side the acoustic signal with which the correlation reduction signal is not added.

Accordingly, the center component, for example, a component corresponding to a vocal, in many pieces of music including a vocal and a musical accompaniment, is localized at a position more frontward than a center of the vehicle 200. As a result, a more natural acoustic field can be provided to the user. Moreover, the vehicle-mounted acoustic field control system may output only from the speakers 50_a_ and 50_b_ on the front seat side an acoustic signal of which center component is reduced after adding the correlation reduction signal to an acoustic signal including the center component.

Moreover, in FIG. 12B, the correlation reduction signal is delayed to achieve an echo effect. However, without delaying the correlation reduction signal, an acoustic signal including the center component may be added with the correlation reduction signal.

<Modifications>

The embodiments of the invention are described above. The invention is not limited to the embodiments mentioned above, and various different modifications are possible. Hereinafter, some modifications are described. Moreover, each of all embodiments including the embodiments described above and below may be combined with another, optionally.

The embodiments described above explain the case where Hilbert transform is used to generate a signal consisting of the real part and the imaginary part from each of the acoustic signals for the multiple channels. However a method of transforming a signal is not limited to Hilbert transform, and another method may be used to generate the signal consisting of the real part and the imaginary part.

In the embodiments described above, the left and right channels are used as an example of the multiple channels. However, the invention is applicable to channels other than the left and right channels. For example, the invention is applicable to 5.1 channels.

In the embodiments described above, a LPF is used for smoothing a time variation of the correlation coefficient $\alpha$. However, a method for smoothing the variation is not limited to the LPF, but the correlation coefficient a may be smoothed by envelope processing or moving average.

In the embodiments described above, the sound source 20 is, for example, an audio-playback apparatus such as a CD player. However, the sound source 20 may be a video-playback apparatus such as a DVD player or a TV tuner.

In the embodiments described above, a weighting coefficient $(1\text{-}2\alpha_0)$ is used for the component of the imaginary part in the power $P_2$. However, a value of the weighting coefficient is not limited to $(1\text{-}2\alpha_0)$. The value may be, for example, a quadratic equation of the specific correlation coefficient $\alpha_0$.

In the embodiments described above, the acoustic signal L' and the acoustic signal R' are only signals to be output to the output part 12, in the controller 13 of the signal processing apparatus 10 shown in FIG. 2. However, as shown in FIG. 8, the center component Ce generated by the center component generator 104 may be output to the output part 12.

What is claimed is:

1. An acoustic field control system comprising:

a sound source;

speakers; and a signal processing apparatus that processes audio signals input from the sound source, the signal processing apparatus coupled between the sound source and the speakers and comprising a signal processor configured to:

a compute, from the input audio signals for a plurality of channels, a first correlation coefficient representing a level of correlation among the input audio signals for the plurality of channels;

derive, from the first correlation coefficient, a second correlation coefficient, a value of the second correlation coefficient varying over time more gradually than a value of the first correlation coefficient over time, such that a slope of the second correlation coefficient over time is smoother than a slope of the first correlation coefficient over time; and extract, from the input audio signals for the plurality of channels, a correlation component that is common in the input audio signals for the plurality of channels by using the second correlation coefficient, to produce output audio signals for the plurality of channels in which the correlation components has been reduced compared to the input audio signals for the plurality of channels, the output audio signals being supplied to the speakers, wherein the signal processor converts each of the input audio signals into a signal consisting of a real part and an imaginary part, computes the first correlation coefficient based on the signal consisting of the real part and the imaginary part, computes a square value of a vector corresponding to each of the input audio signals, the computes a specific correlation coefficient by which a value of the imaginary part in a first power is weighted, based on a value of the first power obtained by summing the square values computed and a value of an inner product of the vector, further computes a value of a second power by weighting the value of the imaginary part in the first power by using the specific correlation coefficient, and then computes the first correlation coefficient based on the value of the second power and the value of the inner product, and extracts the correlation component from the input audio signals by multiplying the second correlation coefficient, but not the first correlation coefficient, by a sum of the vectors corresponding to each of the input audio signals.

2. The acoustic field control system according to claim 1, wherein the signal processor shifts a phase of the signal corresponding to the real part of each of the input audio signals by 90 degrees and then generates the signal corresponding to the imaginary part of each of the input audio signals.

3. The acoustic field control system according to claim 1, wherein the signal processor computes the first correlation coefficient based on the value of the real part in the second power and the value of the inner product.

4. The acoustic field control system according to claim 1, wherein the signal processor derives the second correlation coefficient by using a low pass filter.

* * * * *